United States Patent
Shimada et al.

(10) Patent No.: US 8,794,584 B2
(45) Date of Patent: Aug. 5, 2014

(54) RUBBER MOUNT

(71) Applicant: Honda Motor Co., Ltd., Tokyo (JP)

(72) Inventors: Kazuyuki Shimada, Wako (JP); Yukihiro Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/711,382

(22) Filed: Dec. 11, 2012

(65) Prior Publication Data

US 2013/0175424 A1     Jul. 11, 2013

(30) Foreign Application Priority Data

Jan. 10, 2012   (JP) .................................. 2012-001817

(51) Int. Cl.
  *F16M 13/00*       (2006.01)
(52) U.S. Cl.
  USPC ............................ 248/635; 248/615; 248/634
(58) Field of Classification Search
  USPC ......... 248/560, 580, 608, 609, 615, 632, 634, 248/635
  See application file for complete search history.

(56) References Cited

U.S. PATENT DOCUMENTS

| | | | | | |
|---|---|---|---|---|---|
| 1,830,058 | A | * | 11/1931 | Helmond | 248/615 |
| 2,602,616 | A | * | 7/1952 | Helmond | 248/615 |
| 3,575,288 | A | * | 4/1971 | Brucken | 206/320 |
| 4,067,525 | A | * | 1/1978 | Allen | 248/632 |
| 5,462,395 | A | | 10/1995 | Damm et al. | |
| 6,354,558 | B1 | * | 3/2002 | Li | 248/615 |
| 7,178,795 | B2 | * | 2/2007 | Huprikar et al. | 267/141.1 |
| 7,510,163 | B2 | * | 3/2009 | Schlitzkus et al. | 248/635 |
| 7,926,780 | B2 | * | 4/2011 | Yeh et al. | 248/632 |
| 8,056,880 | B2 | * | 11/2011 | Tsuchida | 248/638 |
| 8,132,640 | B2 | * | 3/2012 | Heitkamp et al. | 180/379 |
| 2008/0230676 | A1 | * | 9/2008 | Hansemann et al. | 248/634 |
| 2009/0057525 | A1 | * | 3/2009 | Yeh et al. | 248/638 |
| 2009/0189051 | A1 | * | 7/2009 | Love | 248/635 |

FOREIGN PATENT DOCUMENTS

| | | |
|---|---|---|
| DE | 29 19 038 A1 | 11/1980 |
| DE | 43 10 002.3-53 C1 | 4/1994 |
| EP | 2 474 431 A1 | 7/2012 |
| JP | 2002-13590 A | 1/2002 |
| WO | WO 2009/093754 A1 | 7/2009 |

OTHER PUBLICATIONS

European Search Report dated: Aug. 29, 2013.

* cited by examiner

*Primary Examiner* — Bradley Duckworth
(74) *Attorney, Agent, or Firm* — Arent Fox LLP

(57) ABSTRACT

A rubber mount includes a cylindrical rubber member (6) formed with an annular groove (12) to engage a component part (4) to be supported, and a threaded bolt (7) passed through a central axial bore (11) of the rubber member and having a threaded part (24) in a forward end thereof to be threaded into a base member (1). The intermediate part is provided with a larger diameter than the threaded part, and a pair of annular grooves (25, 26) are formed on an outer circumferential surface of the intermediate part. The rubber member is axially compressed by the head (21, 22) of the threaded bolt when the threaded bolt is fully threaded into the hole. The rubber mount consists a small number of component parts, and is easy to install, but is still able to firmly support the component part and provide a favorable vibration insulation capability.

7 Claims, 6 Drawing Sheets

RUBBER MOUNT

TECHNICAL FIELD

The present invention relates to a rubber mount for resiliently supporting a component part on a base member, and in particular to a rubber mount which is capable of firmly supporting a component part with a favorable vibration isolating performance.

BACKGROUND ART

Various automotive component parts are inevitably subjected to vibrations and impacts as the vehicle travels over irregular road surfaces. Conversely, component parts such as electric motors and fluid pipes that produce vibrations and impacts are mounted on the vehicle body. In either case, it is often necessary to prevent the vibrations and impacts from being transmitted from the vehicle body to the component parts or from the component part to the vehicle body. For this purpose, it is often practiced to support the component part on the vehicle body via a rubber mount which resiliently supports the component part and insulates the vibrations and impacts.

JP2002-13590 discloses a rubber mount of this kind. A cylindrical rubber member is provided with an annular groove on the outer circumferential surface thereof, and the edge of the component part surrounding an opening thereof is fitted into the annular groove. The rubber member is provided with a central axial bore, and a tubular collar is placed in the central axial bore. A threaded bolt is passed through the central bore of the tubular collar and threaded into a threaded opening of the vehicle body so that the component part is supported by the vehicle body via the rubber member, and the compressive load that is applied to the rubber member by the threaded bold is controlled by the tubular collar. The length of the collar is related to the axial length of the rubber member such that a prescribed compressive load is applied to the rubber member.

This prior art provides a reasonable insulation of vibrations and impacts between the vehicle body and the component part, but is accompanied by a few disadvantages. First of all, the need of the collar in addition to the rubber member and the threaded bolt increases the number of necessary component parts, and complicates the assembly process. If the collar is inadvertently omitted, the axial load on the rubber member cannot be properly set, and the rubber mount is unable to function properly.

In the design of a rubber mount, it is important that the component part to be supported is adequately firmly supported so as not to be displaced excessively or unpredictably (or to be even dislodged from the rubber mount), but is required to be adequately resiliently supported in order to achieve a desired vibration insulation performance.

SUMMARY OF THE INVENTION

In view of such problems of the prior art, a primary object of the present invention is to provide a rubber mount which consists a small number of component parts, and is easy to install.

A second object of the present invention is to provide a rubber mount which can firmly support a component part to be supported while providing a favorable vibration insulation capability.

Such objects of the present invention can be accomplished by providing a rubber mount for resiliently supporting a component part on a base member, comprising: a cylindrical rubber member formed with a support groove on an outer circumferential surface thereof for engaging the component part and a central axial bore; and a threaded bolt passed into the central axial bore of the rubber member and including an intermediate part received in the central axial bore of the rubber member, a head provided on one end of the intermediate part and a threaded part provided on the opposite end of the intermediate part and threaded into a hole of the base member, the intermediate part being provided with a larger diameter than the threaded part; wherein a recess is formed on an outer circumferential surface of the intermediate part.

Because the intermediate part has a greater outer diameter than the threaded part, the compression of the rubber member can be easily controlled by suitably selecting the axial length of the intermediate part in relation to the axial length of the rubber member such that an annular shoulder surface defined in the forward end of the intermediate part (large diameter part) is caused to abut the opposing surface of the base member when the threaded bolt is fully fastened. The elimination of the need for a collar reduces the number of component parts and simplifies the assembly process. The head as used herein may mean not only the rear end of the threaded bolt configured to be engaged by a fastening tool but also any radially enlarged part in a rear end part of the threaded bolt which is effective in compressing the rear axial end of the rubber member.

Preferably, the threaded bolt is dimensioned such that the rubber member is axially compressed by the head when the threaded bolt is fully threaded into the hole. For a stable operation of the rubber member in insulating vibrations and impacts, it is preferred that the rubber member is firmly attached to the threaded bolt, and the rubber member is prevented from undergoing irregular deformations. According to this aspect of the present invention, the intermediate part is not required to be tightly fitted into the central axial bore of the rubber member in the initial stage of the assembly process so that the rubber member is prevented from resisting the effort to fasten the threaded bolt, and the rubber member is prevented from undergoing a twisting deformation during the process of fastening the threaded bolt. However, once the threaded bolt is fully fastened and the rubber member is axially compressed as a result, the material of the rubber member is forced into the recess on the intermediate part of the threaded bolt so that the rubber member and the threaded bolt are firmly attached to each other, and the vibration insulation performance of the rubber member can be fully achieved.

Furthermore, when the threaded bolt is unfastened, the rubber member is left relatively free from stress, and can be relatively easily separated from the threaded bolt. Therefore, the work involved in recycling the rubber mount by separating the rubber material from the metallic material is simplified.

According to a certain aspect of the present invention, the central axial bore includes a truly cylindrical middle section and a pair of tapering flare sections formed on either axial end of the central axial bore. Additionally, an outer diameter of the intermediate part of the threaded bolt may be substantially the same as an inner diameter of the truly cylindrical section of the central axial bore.

Thereby, the insertion of the threaded bolt into the central axial bore of the rubber member is facilitated, and the friction between the threaded bolt and the rubber member during the fastening process can be minimized. Also, this configuration of the rubber member is advantageous in forcing the material of the rubber member into the recess in a predictable manner.

Alternatively, the outer diameter of the intermediate part of the threaded bolt may be somewhat smaller than the inner diameter of the truly cylindrical section of the central axial bore, or the outer diameter of the intermediate part of the threaded bolt may even be slightly greater than the inner diameter of the truly cylindrical section of the central axial bore to the extent as long as the assembly work is not hampered thereby or the rubber member is not subjected to any intolerable stress during the assembly process.

According to the tests conducted by the inventors, a particularly desired result was obtained when the recess formed on an outer circumferential surface of the intermediate part comprises a pair of annular grooves axially spaced from each other.

Also, when the support groove comprises an annular groove formed on the outer circumferential surface of the rubber member axially intermediate between the two annular grooves formed on the intermediate part of the threaded bolt, a favorable insulation of vibrations and a firm support of the component part can be achieved at the same time.

To ensure a favorable attachment between the threaded bolt and the rubber member (without using a bonding agent or a vulcanization process) and minimize the localized stress in the rubber member, each annular groove may be defined by an arcuate line as seen in cross section.

When the component part comprises a support bracket for a fuel pipe, the vibrations caused by the pulsating flow of the fuel in the fuel pipe is prevented from being transmitted to the vehicle body by using a highly simple structure.

BRIEF DESCRIPTION OF THE SEVERAL VIEWS OF DRAWINGS

Now the present invention is described in the following with reference to the appended drawings, in which.

DETAILED DESCRIPTION OF THE INVENTION

Figure 1:
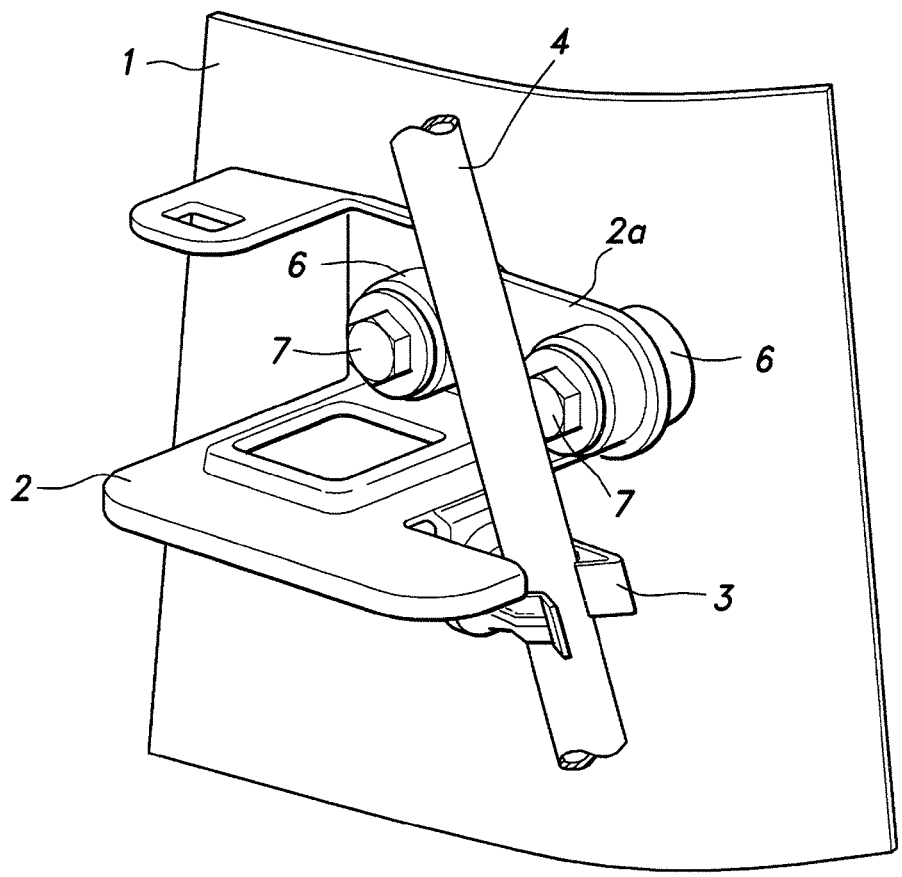
FIG. 1 is a perspective view of a rubber mount according to the present invention supporting a fuel pipe on a damper mount of a vehicle body.
Figure 2:
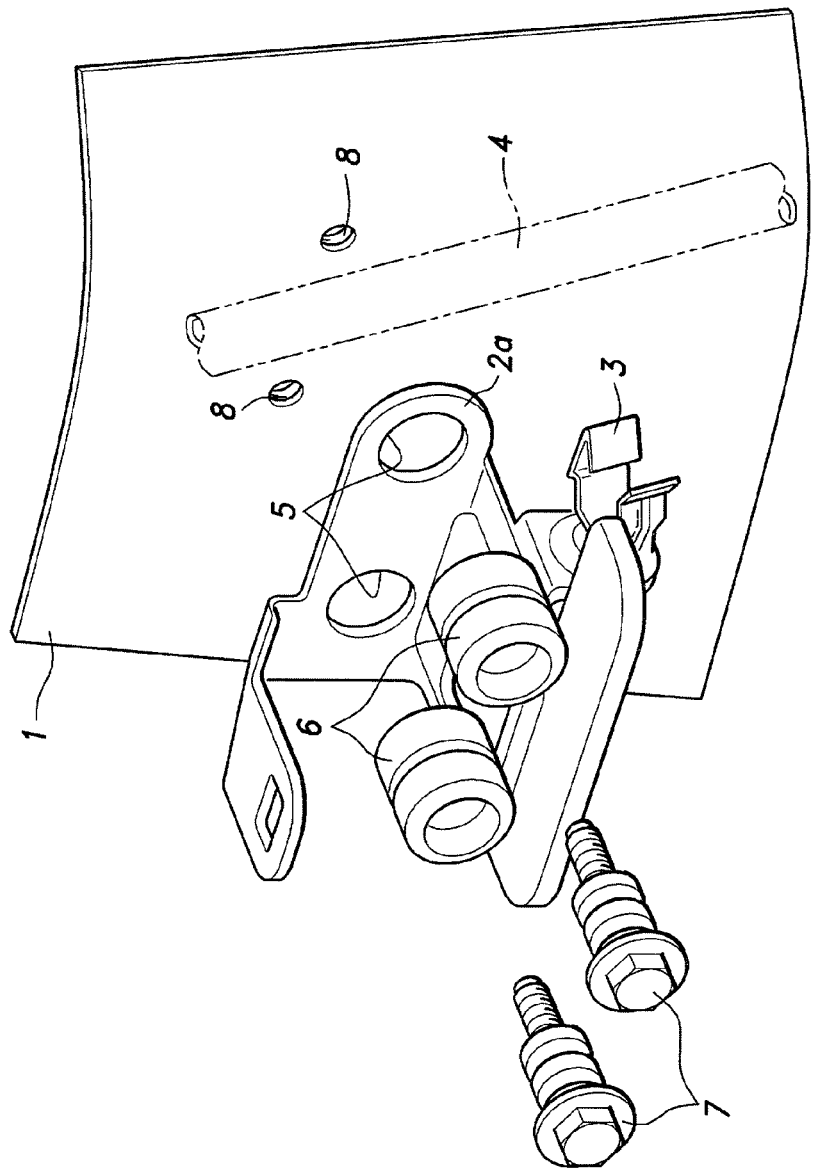
FIG. 2 is an exploded perspective view of the rubber mount.

In the following description, the present invention is applied to a rubber mount for supporting a fuel pipe in an automotive engine room. Referring to FIG. 1, this rubber mount supports a fuel pipe bracket 2 made of stamp formed steel on a substantially vertical wall of a damper mount 1 made of stamp formed steel. The damper mount 1 is a part of a vehicle body that supports the upper end of a wheel suspension damper not shown in the drawings. The fuel pipe bracket 2 in turn supports a fuel pipe 4 (made of steel or other metallic material) via a plastic pipe clip 3. As shown in FIG. 2 also, the fuel pipe bracket 2 includes a vertical wall 2a that opposes the vertical wall of the damper mount 1 and is provided with a pair of mounting holes 5 arranged laterally next to each other in a spaced relationship, and the vertical wall of the damper mount 1 is formed with a corresponding pair of threaded holes 8 consisting of welded nuts or self-tapped holes having a substantially smaller diameter than the mounting holes 5 of the fuel pipe bracket 2. In the illustrated embodiment, each threaded hole consists of a welded nut.

A cylindrical rubber member 6 is fitted in each of the mounting holes 5 of the vertical wall 2a of the fuel pipe bracket 2, and a partly threaded bolt 7 is passed through each rubber member 6 and threaded into the corresponding threaded hole 8.

Figure 3:
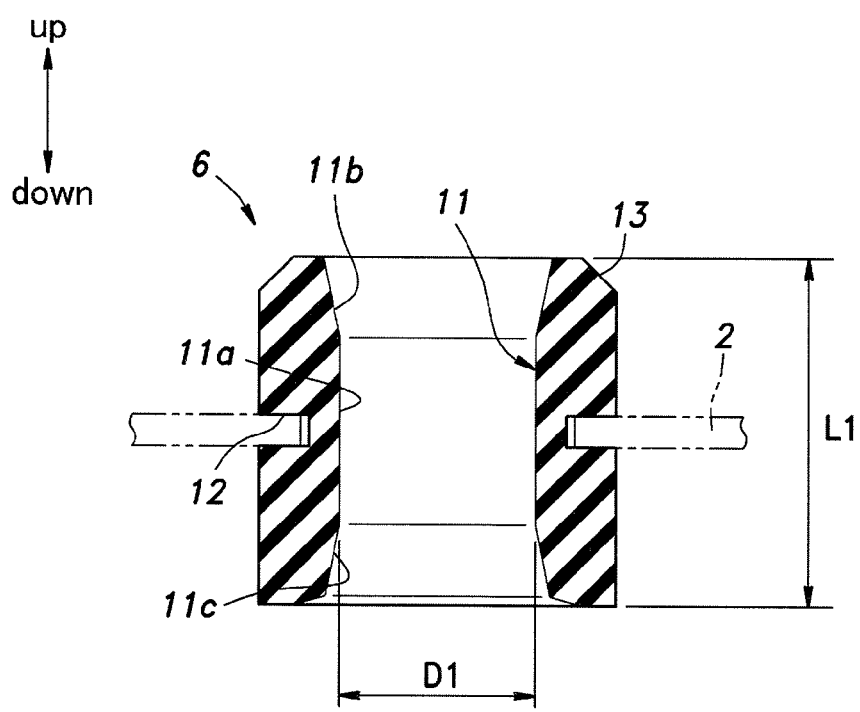
FIG. 3 is a vertical sectional view of a rubber member of the rubber mount.

Referring to FIG. 3, the rubber member 6 is provided with a central axial bore 11 and is somewhat elongated in the axial direction (with an axial dimension of L1). An annular groove (support groove) 12 (having a rectangular cross section) is formed on the outer circumferential surface thereof of the rubber member 6 in an axially middle part thereof so that the peripheral edge of the vertical wall 2a of the fuel pipe bracket 2 defining the corresponding mount hole 5 can be resiliently fitted therein. The axially middle part 11a of the central axial bore 11 is true cylindrical in shape (having an inner diameter of D1), and is tapered (or flared) at each axial end thereof 11b and 11c. The outer periphery of the rubber member 6 at an upper end thereof is beveled or rounded at the part indicated by numeral 13.

Figure 4:
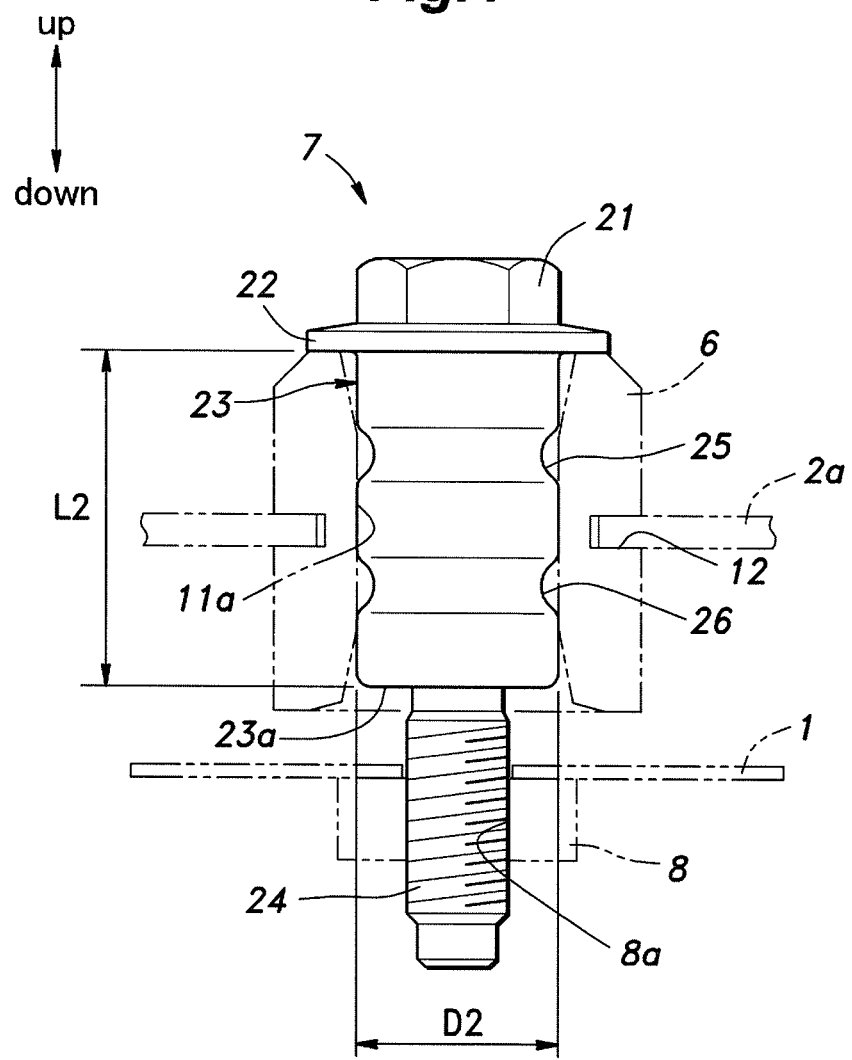
FIG. 4 is a side view of a threaded bolt passed through a central axial bore of the rubber member.

The threaded bolt 7 is formed by thread rolling, and, as shown in FIG. 4, includes a hexagonal head 21 configured to be engaged by a fastening tool such as a spanner, a radial flange 22 formed in the lower end of the hexagonal head 21, a large diameter portion 23 having a constant diameter and dimensioned to be inserted in the central axial bore 11 of the rubber member 6 and a threaded portion 24 configured to be threaded into a female thread 8a of the threaded hole 8, in that order from the upper to the lower ends thereof. The large diameter portion 23 has a length (vertical dimension) L2 which is smaller than the axial dimension L1 of the rubber member 6 by a prescribed length, and an outer diameter D2 which is substantially the same as the inner diameter D1 of the central axial bore 11 of the rubber member 6. Furthermore, a pair of annular grooves 25 and 26 each having a cross section defined by an arcuate line are formed around the large diameter portion 23 in an axially spaced relationship. When the threaded bolt 7 is fully received in the central axial bore 11 of the rubber member 6, the annular groove 12 on the outer circumferential surface of the rubber member 6 is located axially intermediate between the two annular grooves 25 and 26, and the annular grooves 25 and 26 are preferably located adjacent to either axial end of the truly cylindrical section of the central axial bore 11. In the illustrated embodiment, the upper end of the upper groove 25 and the lower end of the lower groove 26 substantially coincide with the respect terminal parts of the truly cylindrical section of the central axial bore 11 in an unstressed state of the rubber member 6.

Figure 5:
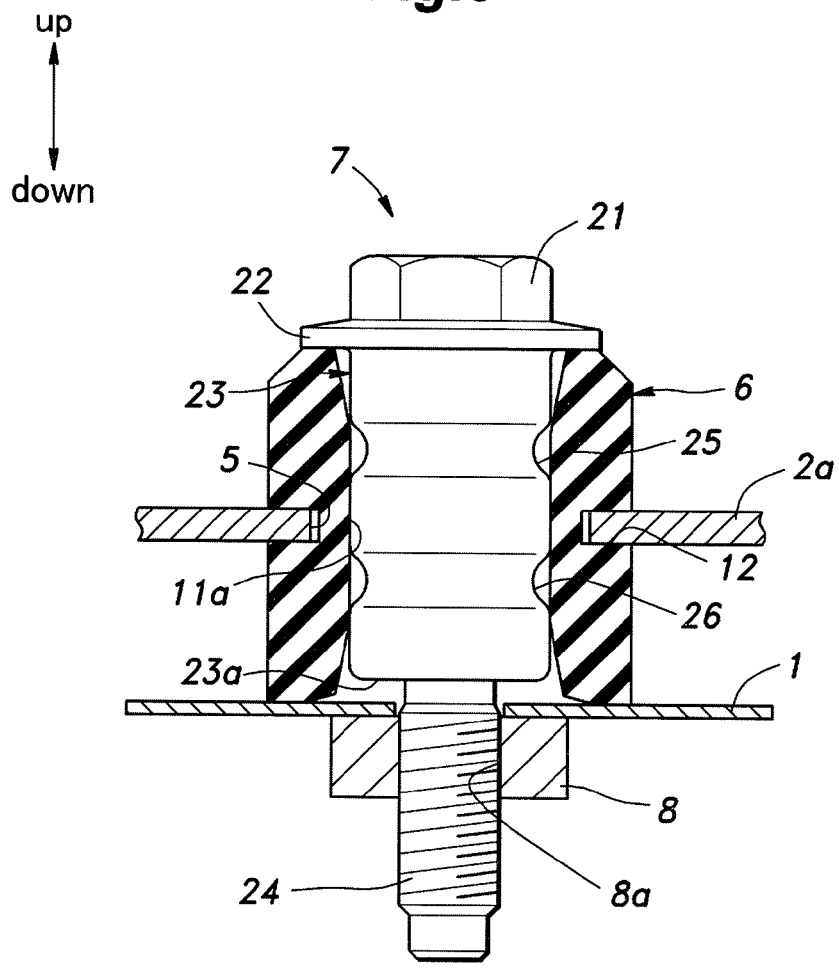
FIG. 5 is a sectional view of the rubber mount when the threaded bolt is in a partly fastened state.
Figure 6:
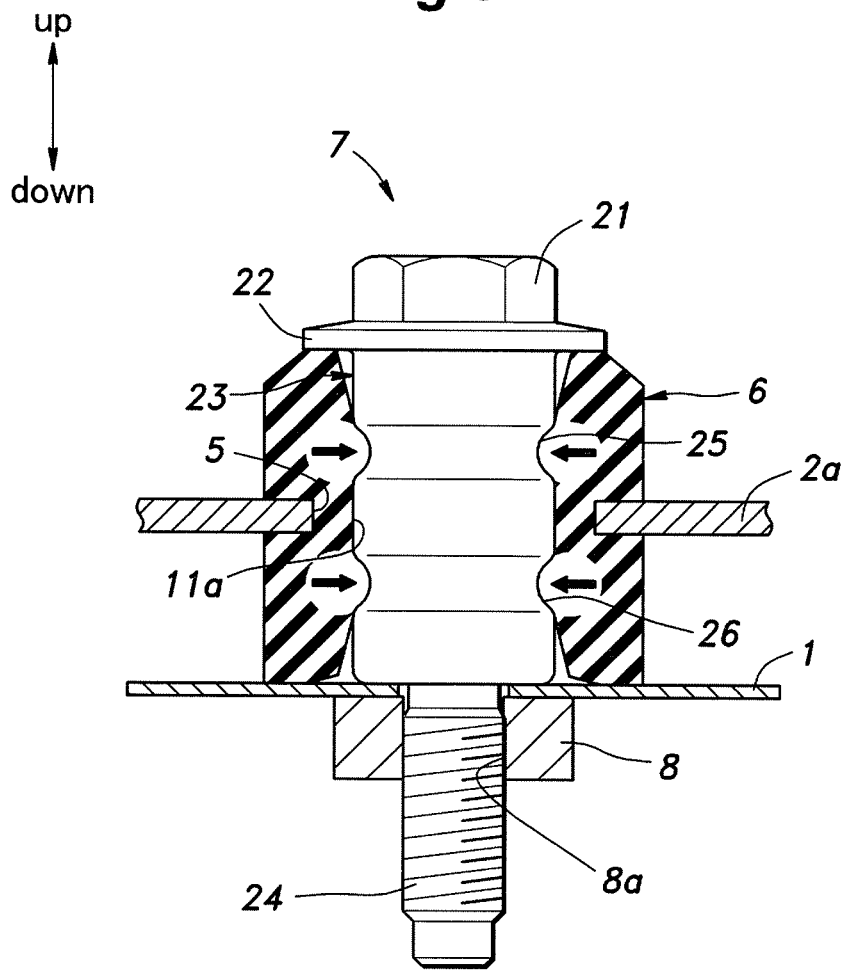
FIG. 6 is a view similar to FIG. 5 when the threaded bolt is fully fastened.

How this rubber mount is installed is described in the following. First of all, a pair of rubber members 6 are secured to the bracket 2 by resiliently forcing the edge of vertical wall 2a defining each mounting hole 5 into the annular groove 12 of the corresponding rubber member 6. Then, as shown in FIG. 5, the threaded bolts 7 are respectively passed into the central axial bores 11 of the rubber members 6, and are threaded into the corresponding threaded holes 8. At this time, because of the presence of the annular grooves 25 and 26, the area of contact between each large diameter portion 23 and the surrounding wall surface of the central axial bore 11 is minimized. Therefore, not only the insertion of the threaded bolt 7 into the central axial bore 11 of the rubber member 6 is facilitated, but also the rubber member 6 is prevented from being unduly twisted or otherwise deformed by the frictional engagement with the large diameter portion 23 of the threaded bolt 7 during the fastening process.

Each threaded bolt 7 is threaded into the threaded hole 8 until the lower annular shoulder surface 23a of the large diameter portion 23 abuts the upper surface of the damper mount 1. At this time, each rubber member 6 is axially slightly compressed between the flange 22 and the damper mount 1 because the large diameter portion 23 is slightly shorter than the axial dimension of the rubber member 6 (L2<L1). This causes the rubber member 6 to expand in radial direction, both inward and outward, so that the material of the rubber member 6 is resiliently forced to flow into the annular grooves 25 and 26. Because each annular groove 25, 26 is defined by a smooth surface, creation of localized stress in the rubber member 6 can be avoided.

As discussed above, in the illustrated embodiment, once each threaded bolt 7 is fully fastened, the rubber member 6 is firmly restrained by the large diameter portion 23 of the threaded bolt 7 owing to the deformation of the rubber member 6 into the annular grooves 25 and 26. In particular, owing to this arrangement, the fuel pipe bracket 2 is prevented from being dislodged from the annular groove 12 of each rubber member 6 even though the force required to fit the edge of the vertical wall 2a into the annular groove 12 is relatively small. Therefore, the fuel pipe bracket 2 which is secured by the axially intermediate point (in particular, axially intermediate point between the two annular grooves 25 and 26) of each rubber member 6 so that the fuel pipe bracket 2 is firmly supported by the rubber members 6 even though the rubber members 6 are constructed as relatively bulky members for an improved damping effect. In particular, even when the vehicle is traveling over irregular road surfaces, the fuel pipe 4 supported by the fuel pipe bracket 2 can be favorably supported, and the fuel pipe 4 is not subjected to any significant bending stress, and the pulsation of the fuel flow in the fuel pipe 4 is prevented from being transmitted to the vehicle body.

When the fuel pipe bracket 2 is required to be removed from the damper mount 1, each threaded bolt 7 is unfastened, and the bracket 2 is removed from the annular groove 12 of each rubber member 6. The removal of the bracket 2 from the annular groove 12 of each rubber member 6 at this time is facilitated because the compressive load on each rubber member 6 is already removed, and the resilient deformation of the rubber member 6 can be more readily achieved.

Although the present invention has been described in terms of a preferred embodiment thereof, it is obvious to a person skilled in the art that various alterations and modifications are possible without departing from the scope of the present invention which is set forth in the appended claims. For instance, the annular grooves formed in the large diameter portion may also consist of a single annular groove or a larger number of annular grooves, and may also be replaced by various forms of recesses such as dimples without departing from the spirit of the present invention. Furthermore, the component part to be supported by the rubber mount of the present invention is not limited to a fuel pipe bracket, but may consist of any other component part which requires a resilient support.

The contents of the original Japanese patent application on which the Paris Convention priority claim is made for the present application as well as the contents of the prior art references mentioned in this application are incorporated in this application by reference.

The invention claimed is:

1. A rubber mount for resiliently supporting a component part on a base member, comprising:
   a cylindrical rubber member formed with a support groove on an outer circumferential surface thereof for engaging the component part and a central axial bore; and
   a threaded bolt passed into the central axial bore of the rubber member and including an intermediate part received in the central axial bore of the rubber member, a head provided on one end of the intermediate part and a threaded part provided on the opposite end of the intermediate part and threaded into a hole of the base member, the intermediate part being provided with a larger diameter than the threaded part;
   wherein a recess is formed on an outer circumferential surface of the intermediate part, the recess providing an area where no contact between the intermediate part of the threaded bolt and a surrounding wall surface of the central axial bore takes place in an unstressed state of the rubber member,
   the recess is arranged apart from the head and the threaded part, and
   the threaded bolt is dimensioned such that the rubber member is axially compressed by the head and thereby partly forced into the recess when the threaded bolt is fully threaded into the hole.

2. The rubber mount according to claim 1, wherein the central axial bore includes a cylindrical middle section and a pair of tapering flare sections formed on either axial end of the central axial bore.

3. The rubber mount according to claim 2, wherein an outer diameter of the intermediate part of the threaded bolt is substantially the same as an inner diameter of the cylindrical section of the central axial bore.

4. The rubber mount according to claim 1, wherein the recess formed on an outer circumferential surface of the intermediate part comprises a pair of annular grooves axially spaced from each other.

5. The rubber mount according to claim 4, wherein the recess further comprises an additional annular groove formed on the outer circumferential surface of the rubber member axially intermediate between the two annular grooves formed on the intermediate part of the threaded bolt.

6. The rubber mount according to claim 4, wherein each annular groove is defined by an arcuate line as seen in cross section.

7. The rubber mount according to claim 1, wherein the component part comprises a support bracket for a fuel pipe.

* * * * *